Oct. 31, 1961 O. L. ANDERSON ET AL 3,006,067
THERMO-COMPRESSION BONDING OF METAL TO
SEMICONDUCTORS, AND THE LIKE
Filed Oct. 31, 1956

INVENTORS O. L. ANDERSON
H. CHRISTENSEN
BY H. O. Wright
ATTORNEY 3,006,067
Patented Oct. 31, 1961

3,006,067

THERMO-COMPRESSION BONDING OF METAL TO SEMICONDUCTORS, AND THE LIKE

Orson L. Anderson, Morristown, and Howard Christensen, Springfield, N.J., assignors to Bell Telephone Laboratories, Incorporated, New York, N.Y., a corporation of New York Filed Oct. 31, 1956, Ser. No. 619,639
6 Claims. (Cl. 29—470)

This invention relates to a method of bonding. More particularly, it relates to a method of bonding metallic leads to members of semiconductive material.

Heretofore metallic leads have been secured to members of semiconductive material by soldering whenever a strong connection was required. This requires the preliminary step of depositing a layer of metal on the surface of the member and diffusing or alloying the metal with the area of the surface to which the metallic lead is to be soldered. Where a mechanically strong connection between the lead and the semiconductive member is necessary, both the metallic coating and the solder must be of relatively high melting point materials with the result that the semiconductive material in the vicinity of the soldered connection must be heated to or above the temperature at which new dislocations in the semiconductive material are formed and existing dislocations are displaced.

Heating above the eutectic temperature of the materials involved is also usually necessary with the result that alloys which are objectionably weak and brittle are frequently formed. A further objectionable feature encountered is that heating to the degree required for soldering often removes the temper and weakens the metallic lead wire. In many instances any disturbance of existing dislocations or the formation of new dislocations in the semiconductive member is undesirable.

Furthermore, the most skillfully made soldered joints leave much to be desired from the standpoint of mechanical strength and ruggedness, particularly for use in apparatus which is to be subjected to considerable vibration and repeated mechanical shocks. For example, many semiconductive members are employed in mobile radio apparatus and the like.

The method of the present invention is designed to avoid the above-described difficulties encountered with soldered connections and is based upon the combined use of moderate heat and moderate pressure, the heat being insufficient to raise the temperature of the semiconductive member to either the dislocation forming temperature of the member or the eutectic temperature of the materials involved and the pressure being well below the pressure required to fracture the semiconductive member or to grossly deform the metallic lead wire. The combined moderate heat and moderate pressure need be maintained for only a relatively short time, varying between a few seconds and not more than a quarter of an hour.

Strong bonds have been made with pressures which produced deformations of the metallic leads (decrease in dimension parallel to the direction of the pressure) of only ten to twenty percent. In general, it is not necessary to employ a pressure which produces as much as a thirty percent deformation. Higher pressures can, of course, be used but obviously they must not be sufficient to fracture the semiconductive member or to so deform the metallic lead as to make it mechanically weak adjacent to the bond. Obviously, moderate deformation is less likely to develop a weak point in the lead adjacent to the bond.

The preliminary step of depositing a layer of metal on the surface of the semiconductive member and diffusing or alloying the metal with the surface of the member is not required in making a strong thermo-compressive bond. However, strong bonds of the invention can be made equally well to such metallized areas on the surface of the semiconductive member if such areas are deemed desirable in order to provide electrodes or to impart specific characteristics to an adjacent portion of the semiconductive member. For obvious reasons, bonds of the invention are referred to as "thermo-compression bonds."

Devices such as various kinds of transistors, rectifiers, and the like, are finding widening fields of extensive usefulness. Much effort is being directed toward making such devices more rugged and toward increasing the upper limit of the microwave frequency range in which these devices can be feasibly employed. The latter objective normally involves the problem of fabricating elements of very small physical size. Indeed, to an increasing degree, it is being discovered that, in many instances, devices of these types could advantageously be made in virtually microscopic sizes provided the mechanical difficulties of fabricating durable minute units could be solved. An outstanding mechanical difficulty in many such cases is that of securing a strong, small-area, accurately positioned bond between small electrical conductors and minute elements of semiconductive material.

Within the presently feasible operating frequency ranges, the matter of establishing sufficiently strong, rugged, reliable, precisely positioned, small-area, electrical contacts, as required for certain more rigirous uses of the devices, has presented a problem for which the prior art has been able to devise no really satisfactory solution.

In efforts to extend the upper microwave frequency limit at which these devices can be advantageously employed, the problem of greatly reducing the size without disproportionate impairment of the mechanical and/or electrical properties of the devices becomes an even more difficult problem to solve.

By application of the principles of the present invention, acceptable solutions to the several above-indicated problems, which represent substantial advances beyond the best current prior art practices, can be realized.

As mentioned hereinabove, for the purposes of the present application, including the appended claims, the term "thermo-compression bond" is defined as a bond effected without the use of any flux or solder, or the necessity of using an intermediate layer between the surfaces to be bonded together and at combinations of temperature, pressure and duration of treatment such that a strong bond is obtained but no flow of the semiconductive materials and no melting and/or alloying phenomena necessarily take place in either of the materials being bonded.

The conditions of temperature, pressure and time required to make a strong bond, in accordance with the principles of the present invention, are insufficient to create additional dislocations or to displace existing dislocations in a semiconductor such as germanium, silicon, or the like, or to result in the melting and/or alloying or flow of the surface of either of the materials in the vicinity of the bond.

No diffusion of either bonded material into the other in the vicinity of a bond of the invention has been detected, notwithstanding the fact that diligent efforts, implemented by the most sensitive methods and means presently available to the art, were employed in testing the bonds for diffusion.

In some specific instances, particularly in the making of semiconductive material rectifiers, it may be desirable, subsequent to making the bond, to induce "doping" or alloying of the semiconductor in the vicinity of the bond by an additional heating, for a short interval, to the eutectic temperature of the bond, as will be described in detail hereinunder. It should be noted that the necessity for this additional heating to produce doping or diffusion of the metal into the semiconductor after the bond has been made is further strong evidence that no appreciable diffusion (or doping) of the metal into the semiconductive material results from the bonding process itself.

The deformation of the metal employed, in the making of a bond of the invention, is much less than is required for cold welding or percussion welding, i.e., the pressure exerted is not sufficient to produce a cold weld or a percussion weld.

Bonds made in accordance with the principles of the present invention between metals and semiconductors are, in general, mechanically much stronger than junctions of such materials made by prior art methods. "Stripping tests" of bonds of the invention, when the bonds have been properly made, result in fractures of the adjacent materials, the bonded surfaces remaining intact. For the purposes of the present application and the appended claims, a "strong bond" is to be understood as one which in a "stripping test" will not fail at the bonded area.

Thermo-compression bonds of the present invention can be made simply, quickly, directly and cheaply at atmospheric pressure and usually in the open air, except in instances where oxidation may prove troublesome, in which case bonding in a hydrogen or other non-oxidizing atmosphere may prove preferable or even indispensable. The process of bonding in accordance with the principles of the present invention does not directly involve the use of expensive evaporating or diffusion equipment requiring the maintenance of high vacua and tedious processing, though good bonds of the invention can be made to areas on semiconductors, and the like, which have had conductive material evaporated upon and/or alloyed with the surface.

The necessary preparation of the surfaces to be bonded comprises simply a thorough cleaning or mechanical scrubbing or scraping of the surfaces to be bonded, as, for example, by a vibrating or rotating wire brush, and hence can be effected quickly and inexpensively. As mentioned above, when oxidation of the surfaces to be bonded (or either of them) may be troublesome, the cleaning and bonding operations should preferably be performed in a non-oxidizing atmosphere.

Since only very moderate deformation of the metallic material and no melting of either of the bonded materials in the vicinity of the bond takes place at the combinations of temperature, pressure and duration of treatment employed in accordance with the principles of the present invention, the bond obtained cannot properly be considered to be either a cold weld or a hot weld. The temperatures employed are not sufficient to remove the temper or otherwise impair the properties of either of the materials bonded, though one technique, to be described in detail hereinunder, prescribes a preliminary heating of the end of a conductor to be bonded to a semiconductor, which heating removes stresses from the conductor end and results in the formation of a rounded or even a globular end.

The bond, also, is readily effected, not only between areas of appreciable extent, but also between areas of microscopic dimensions and is therefore ideal for attaching lead wires to physically small, microwave-frequency, transistors, rectifiers, and other devices employing minute elements of semiconductive material, particularly since the bonding process in no way impairs the electrical or mechanical properties of the semiconductive material. Lead wires for devices for use at microwave frequencies may, in some instances for example, have diameters as small as only a fraction of a mil. Even such fine wires can be satisfactorily bonded in accordance with the principles of the present invention.

It should be borne in mind that extremely accurate means for determining the electrical or mechanical impairment of semiconductive materials are available and well-known to those skilled in the art. The latest and most accurate tests known have failed to detect any impairment of the semiconductive material resulting from bonding leads to it in accordance with the principles of the present invention. The same cannot be said, of course, for soldering or for processes requiring temperatures higher than those required for the bonding process of the present invention.

For the two principal semiconductive materials extensively used at present, namely, germanium and silicon, and at the pressures (deformations) contemplated for use in making the bonds of the invention, dislocation formation or displacement will not be encountered so long as the materials are maintained at temperatures below 400 degrees centigrade and 450 degrees centigrade, respectively.

A significant requisite in the bonding processes of the present invention when applied to the bonding of leads to semiconductive elements is, therefore, that the temperature at which bonding is effected must be less than the eutectic temperature of the combination of the materials being bonded together and also less than the temperature of dislocation formation or displacement for the semiconductive material involved. Stated in other words, the bonding temperature must be less than the lower of the last two temperatures mentioned. The preferred bonding temperature is, however, as high as the above limitations will reasonably permit, since the duration of the bonding process and the probability of failure to secure a strong bond will thereby both be reduced to minima.

Accordingly, a principal object of the invention is to provide a method and means for strongly bonding metal to semiconductive material.

A further object is to provide a method and means for effecting strong, accurately positioned, small-area, bonds between conductive metallic leads of small cross-sectional area and the semiconductive elements of transistors and rectifiers and the like, without any measurable impairment of the electrical or mechanical properties of the material to which the leads are bonded.

Still further objects, features and advantages of the invention will become apparent during the course of the detailed description given hereinunder of illustrative structures shown in the drawings and embodying various of the principles of the present invention, and from the appended claims.

Figure 1:
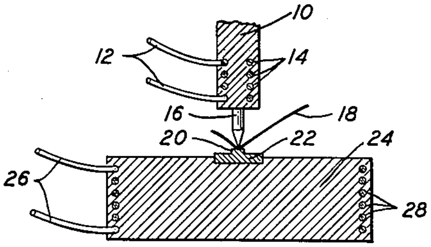
FIG. 1 shows, diagrammatically, the essential elements of a structural arrangement for practicing the principles of the present invention.

In more detail in FIG. 1, a press bed 24 is arranged, by way of specific example, to firmly hold a small silicon or germanium member 22 against pressure exerted in a substantially vertical direction on the upper surface of the member. A press head 10 provided with a pointed or wedge-shaped projection 16 at its lower end is arranged to exert pressure, by any suitable conventional means, not shown, against a point or line on a small raised island or mesa 20 on the upper surface of member 22. The particular specific form or size of member 22 is immaterial insofar as the making of a bond of the invention between it and the conductive lead is concerned. The form illustrated is one chosen to facilitate the fabrication and treatment of semiconductive elements from the standpoint of the optimum convenience in obtaining the precise conditioning and dimensions of the portions directly involved in the determination of the operating characteristics of the elements for high frequency applications.

For the manufacture of miniaturized devices, such, for example, as transistors, either the press bed 24 or the press head 10, or both, should, prior to the application of appreciable pressure, be susceptible of precise positional control both vertically and transversely, as by a device well known in the art as a micromanipulator, used conjointly with a microscope to enable the operator to accurately observe and secure precise alignment of the pieces at the initiation of the process, as well as to facilitate accurate observation and control of deformation of any metallic members being bonded, during the process. Such arrangements, being well known to those skilled in the art, are not shown.

A wire 18 which, for example, may be of suitable conductive material for a semiconductor device lead, such as gold, silver, the eutectic of aluminum and silicon, aluminum, copper, or in some instances gold-plated copper or silver clad gold, or copper, aluminum or the like coated with tin, antimony, indium, or gallium (each, as is well known to those skilled in the art, being appropriate for one or more specific arrangements) is interposed on the surface of island or mesa 20 between the lower edge of projection 16 and portion 20 so as to be pressed against the surface of island or mesa 20 at the point or along the line directly below the edge of projection 16 with a pressure determined by the pressure exerted upon it by projection 16. If substantially a point contact bond is desired, projection 16 is brought to a point of the desired size at its lower end. If a line contact is desired, the lower end of projection 16 is made wedge-shaped with an area equal to the area of the desired line contact.

Provision is made for heating the press bed, the lower end of the press head and the work pieces interposed between them to a temperature suitable for effecting a bond of the invention between the work pieces. The heating means, shown by way of example in FIG. 1, comprise electrical heating coils 14 and 28 having input leads 12 and 26, respectively, these coils heating the materials to be bonded and the adjacent portions of the press to the appropriate temperature for the bonding process contemplated. The required temperature and pressure are, in no instance, sufficiently high to objectionably impair the mechanical or electrical properties of either of the work pieces to be bonded. The temperature, though at least one hundred degrees centigrade and preferably several hundred degrees centigrade, is in all cases well below that necessary to melt either material and is, in addition, as previously described for semiconductive elements, below both the eutectic temperature for the specific combinations of the materials being bonded and the temperature of dislocation formation or displacement at the processing pressure for the semiconductive material to which a bond is to be made. The bond is therefore not of the types produced by soldering or hot welding. Furthermore, no solder or flux is necessarily employed.

As is well known to those skilled in the art, materials such as germanium and silicon, are, at the temperatures contemplated for use in making bonds of the invention, substantially not deformable, but merely shatter if the pressure upon them becomes too great. In general, in bonding a metal to one of the materials listed above in accordance with the principles of the present invention, the force exerted should be such that the metal is deformed (compressed) at the pressure area by between ten to twenty percent and in no case greater than thirty percent.

Since for cold welding or percussion welding sufficient force must be exerted upon the materials to deform them by from fifty to eighty percent (see for example, the text entitled "Handbook of Fastening and Joining of Metal Parts," by Laughner and Hargan, published by McGraw-Hill Book Company, Inc., 1956, particularly Fig. 6.28 at page 267), the bond of the present invention is clearly not a cold weld nor a percussion weld.

It is further of interest to note that the Laughner et al. handbook states that materials having a yield point over 30,000 pounds per square inch cannot be cold welded. In accordance with the principles of the present invention, however, strong thermo-compression bonds can, by way of examples, be made to silicon and germanium which have yield points well in excess of 30,000 pounds per square inch.

The duration or time for which the appropriate pressure and temperature should be maintained to secure a strong bond in accordance with the principles of the present invention, will, of course, vary with the temperature, surface preparation and the ambient conditions in general, as well as with the particular materials which are being bonded together.

By way of particular examples, a gold wire can be strongly bonded to a piece of germanium, when the surfaces to be bonded have been thoroughly cleaned, in less than one minute at a temperature of 200 degrees centigrade with a deformation of twenty percent for the gold, if the process, including preliminary cleaning, is performed in a hydrogen atmosphere at slightly less than normal atmospheric pressure. Indeed, strong bonds of the above-described type have been made in as short a time as five seconds.

In normally clean laboratory air, for bonds made by the same process, with identical conditions (except that the hydrogen atmosphere is, of course, not present), only about thirty percent of the bonds attempted will prove to be "strong" if the time or duration of the process is limited to one minute. However if the process is continued, in each instance, for a duration in the order of ten minutes for each bonding operation (in clean laboratory air), at least ninety-five percent of the bonds will prove to be strong.

In other words, if a minimum time (or duration) of each bonding process is of the essence, the surfaces to be bonded should be thoroughly scrubbed clean and bonded in an atmosphere freed from oxygen.

On the other hand, if it is more desirable to operate in reasonably clean air, strong bonds between most metals and semiconductive materials can be effected at a temperature of 250 degrees centigrade and metal deformation of twenty percent, or less, if each bonding process is continued for a duration in the order of ten to fifteen minutes and the surfaces to be bonded have been mechanically scrubbed clean within a reasonably short time prior to the bonding process. For materials such as aluminum which tend to oxidize rapidly in the presence of air, the material should be cleaned immediately prior to bonding. For the majority of other materials an interval of up to ten minutes in clean laboratory air will normally be satisfactory.

The above and a few other specific illustrative examples of the numerous and varied instances in which the bonding process of the invention has been successfully applied to produce strong bonds are indicated in the following Table I.

TABLE I

*Illustrative semiconductive materials and metal bonds*

| Materials to be bonded together | Bonding temperature, ° C. | Bonding time | Eutectic temperature of combination, ° C. | Dislocation formation temperature of semiconductor, ° C. |
|---|---|---|---|---|
| Gold-germanium | 300 | 15 sec. hydrogen atmosphere. | 356 | 400 |
| Do | 300 | 5 min. clean air. | 356 | 400 |
| Do | 200 | 10 min. clean air. | 356 | 400 |
| Aluminum-germanium.[1] | 300 | 10 min. hydrogen atmosphere. | 425 | 400 |
| Gold-silicon | 300 | do | 375 | 450 |

[1] The aluminum-germanium bond is an instance in which the dislocation forming temperature is lower than the eutectic temperature of the combination.

Generalizing, from a large number of thermo-compression bonds of the invention made between numerous and varied combinations of materials at controlled but differing conditions of temperature, pressure and duration, of which the bonds specifically described hereinabove are partially illustrative, the following principles may be formulated.

The temperature of the work pieces to be bonded should be as high as conveniently practicable, subject to the limitations:

(1) It should be less than the temperature at which either of the materials to be bonded begins to soften or melt;

(2) For bonds between a semiconductive element and another material, it should be less than the lower of the following two temperatures:

(*a*) The eutectic temperature for the combination of materials being bonded;
(*b*) The temperature at which dislocations may be formed or displaced at the processing pressure in the semiconductive element to be bonded.

The pressure with which the work pieces to be bonded are held together should be such that the deformation of a metallic element being bonded will preferably be between ten and twenty percent and in any case will not exceed thirty percent.

In general, the duration required to produce a strong bond between a metallic lead and an element of semiconductive material may vary between a few seconds and a quarter of an hour.

Figure 2:
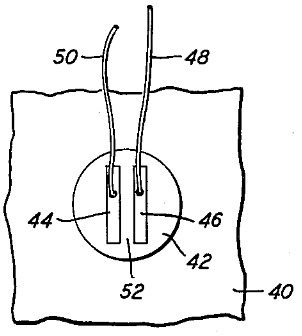
FIG. 2 illustrates, diagrammatically and in enlarged dimensions, the application of the bonding technique of the present invention to facilitate the attachment of leads to a microwave frequency semiconductor device.

Turning now to the remaining figures of the drawing, in FIG. 2 is illustrated, to enlarged dimensions, a degree of miniaturization of a semiconductive transistor which those skilled in the art are presently striving to attain.

In FIG. 2 block 40 is of semiconductive material, either germanium or silicon being extensively employed at the present time. Block 40 may be, for example, 50 mils square by 5 mils thick. Assuming, for example, block 40 to be of positive or P-type semiconductive material, a thin layer of negative or N-type material is created by "doping" or diffusion in accordance with conventional methods on the upper surface of block 40. A raised circular island or mesa 42 is obtained by masking and etching the upper surface of block 40, in accordance with practices well understood in the art, the diameter of mesa 42 being, for example, eight mils, the upper surface of mesa 42 being elevated one mil above the remainder of the upper surface of block 40.

In accordance with present practices in the art, "electrodes" 44 and 46 are formed on the mesa 42 by alloying thin strips of aluminum and gold, respectively, on the upper surface of mesa 42. For operation at approximately 500 megacycles, electrodes 44 and 46 are parallel strips preferably 6 mils long and one mil wide and are separated by a distance of one mil.

To complete the assembly, in accordance with conventional design, electrical leads comprising small strips of aluminum 50 and gold 48 are to be soldered to electrodes 44 and 46, respectively. This has, however, for obvious reasons, proved to be a difficult operation, as well as one requiring extreme care to avoid injury to the assembly and the semiconductive element. One "makeshift" prior art solution is to use leads which depend upon spring contacting wires bearing on the electrodes, but these have proven most unsatisfactory for apparatus which is subjected to mechanical vibration or shocks as the spring contacts do not stay in the desired positions.

Efforts to devise a more practicable and less difficult method of securing leads to semiconductive elements led to the present invention, i.e. to the thermo-compression bond in which by heating both the block 40 and the lead 50 (or lead 48 in turn) to a temperature preferably several hundred degrees centigrade above room temperature but below the eutectic and dislocation temperatures, pressing the lead against the electrode 44 (or electrode 46 in turn, respectively) to cause a deformation of between ten to twenty percent in the lead, and maintaining the temperature and pressure between five seconds and a quarter of an hour, strong bonds of leads 50 and 48 to electrodes 44 and 46, respectively, were obtained. Electrodes 44, as is well known to those skilled in the art, constitutes an emitter and electrode 46 constitutes a "base" electrode (electrically) for the transistor thus formed, the collector comprising the main body of the block to which, in view of its larger size and less critical nature, electrical connection may be made in any of several conventional ways well known to those skilled in the art.

Figure 3:
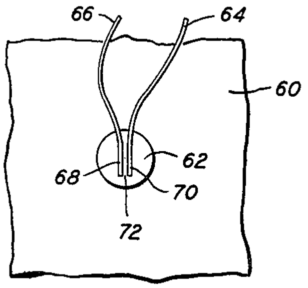
FIG. 3 illustrates, diagrammatically and in enlarged dimensions, the increased degree of miniaturization of a semiconductor device readily realizable by application of the principles of the present invention.

In FIG. 3, an increased degree of miniaturization of a transistor of the general type just described in connection with FIG. 2, above, is illustrated to enlarged dimensions and corresponds generally to that of FIG. 2 except that mesa 62 is only three mils in diameter. Furthermore, in FIG. 3, no preliminary formation of "electrodes" is employed. An end of the aluminum wire 66, having a diameter for example of seven-tenths of a mil, is bonded directly to the surface of mesa 62, the bonded area serving in this instance for the emitter electrode. Likewise, an end of the gold wire 64, also seven-tenths of a mil in diameter, is bonded directly to the surface of mesa 62, at a spacing of four-tenths of a mil from the aluminum wire, to serve as the base electrode. The transistor thus formed has been found to operate satisfactorily at 1,500 megacycles. The fabrication of an entirely satisfactory transistor such as that illustrated in FIG. 3 and described above has heretofore been considered to be virtually impossible by those highly skilled in the art, since the prior art offers no practicable solutions for the mechanical problems involved.

It should be noted that in the arrangement illustrated in FIG. 2, as described in detail above, the preliminary formation of electrodes 44 and 46 can be dispensed with and the ends of the lead wires 50 and 48, respectively, can be bonded over the appropriate areas occupied by the electrodes thus following substantially the manner of fabrication illustrated in FIG. 3 as described in detail. This is so since the electrodes 44 and 46 were provided mainly to facilitate soldering the leads to the areas. The bond of the invention requires no such preparation.

Figure 5:
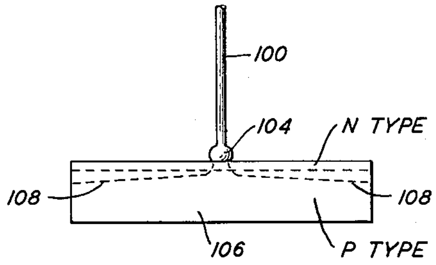
FIGS. 4 and 5 represent, respectively, one method of preparation of a small diameter conductor for bonding and the bond of such a conductor with a piece of semiconductive material in accordance with a specific application of the principles of the present invention.
Figure 4:
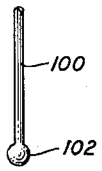

FIGS. 4 and 5 further illustrate the thermocompression bonding process of the invention as applied in a further specific convenient form to the miniaturization of semiconductive devices.

In FIG. 4, a metallic conductor 100 which may, for example, be of gold or aluminum and have a diameter of seven-tenths of a mil, has its end heated, as a preliminary step to bonding, until the metal softens and surface tension causes the end 102 to assume a rounded or even a substantially globular shape with a diameter of substantially double that of the original wire, for example, one and four-tenths mils. The wire is then gradually cooled well below the temperature at which the metal begins to soften. This treatment tends to relax any stresses in the metal at the end of the wire and also to bring impurities to the surface where they can be readily removed.

The rounded end of the wire facilitates pressing it against the surface of a semiconductive element as illustrated in FIG. 5 to effect a bond of the invention. Under pressure the rounded end 102 of wire 100, as shown in FIG. 4, will become somewhat flattened as shown in FIG. 5. In FIG. 5 block 106 can, for example, be a wafer 50 mils square by 5 mils thick of germanium or of silicon of positive or P-type material except for a thin layer at its upper surface which has been converted to negative or N-type material. The flattened end 104 of wire 100 of FIG. 5 can, after the bonding operation, function as a mask and the remainder of the upper surface of block 106 can be etched away, if desired, to the extent indicated, for example, by the broken lines 108. This makes possible the bonding, in accordance with the present invention, of a second electrode to the P-type material, uncovered by etching, at a point very close to the mesa of N-type material immediately beneath the flattened end 104 of conductor 100. The application of these techniques to the fabrication of transistors and related devices is, of course, apparent.

An aluminum lead strongly bonded to a silicon block, in accordance with the principles of the present invention, substantially as illustrated, for example, in FIG. 5, will in many instances prove to be an effective semiconductor rectifier. Alternatively, the species can be fabricated by bonding an aluminum wire or tape to a silicon element in accordance with the method of the invention as described more generally in connection with FIG. 1. Should it not have sufficiently pronounced rectifying properties, the latter can be promptly induced by heating the assembly to the eutectic temperature of silicon and aluminum for a second or two following the completion of the bond and slowly cooling it to room temperature.

Numerous and varied other arrangements and methods within the spirit and scope of the principles of the present invention will readily occur to those skilled in the art. No attempt to exhaustively illustrate all such possibilities has here been made.

What is claimed is:

1. A method of bonding a metallic lead of a material selected from the group consisting of gold, silver, aluminum, copper, gold-plated copper and tinned copper to a semiconductive element of a material selected from the group consisting of silicon and germanium, said method comprising mechanically cleaning the surfaces to be bonded together, heating said metallic lead and said semiconductive element to a temperature approaching but less than the eutectic temperature of the combined materials and the dislocation forming temperature of the semiconductive material, pressing the surfaces to be bonded together with a pressure sufficient to cause at least 10 percent but not over thirty percent deformation of the metallic lead, and maintaining said temperature and said pressure until the lead is firmly bonded to the surface of the semiconductive element.

2. A method of bonding a gold lead to an element of germanium, said method comprising mechanically cleaning the surfaces to be bonded, heating said lead and said element to a temperature approaching but less than the eutectic temperature of gold and germanium and the dislocation forming temperature of germanium, pressing the surfaces to be bonded together with sufficient pressure to cause at least 10 percent but not greater than thirty percent deformation of the gold, and maintaining said temperature and said pressure until the lead is firmly bonded to the semiconductive element.

3. A method of bonding an aluminum lead to an element of germanium, said method comprising enclosing said lead and said element in a hydrogen atmosphere, mechanically cleaning the surfaces to be bonded, pressing the surfaces to be bonded together with a pressure sufficient to produce at least 10 percent but less than thirty percent deformation of the aluminum, heating said lead and said element to a temperature approaching but less than the dislocation forming temperature of germanium and the eutectic temperature of aluminum and germanium at said pressure, and maintaining said temperature and said pressure until the lead is firmly bonded to the semiconductive element.

4. The method of bonding a metallic conductive lead of a material selected from the group consisting of gold, silver, aluminum, copper, gold-plated copper and tinned copper to an electrode formed on the surface of a semiconductive element selected from the group consisting of silicon and germanium by alloying metal selected from the group consisting of gold and aluminum to said surface, said method comprising cleaning the surfaces to be bonded, pressing the surfaces together with a pressure sufficient to produce at least 10 percent but not more than thirty percent deformation of said lead, heating said lead and said element to a temperature approaching but less than the eutectic temperature of the combination of metallic and semiconductive materials and the temperature of dislocation formation or displacement for said element at said pressure, and maintaining said temperature and said pressure until the lead is firmly bonded to the semiconductive element.

5. The method of bonding a lead of a material selected from the group which consists of gold, silver, aluminum, copper, gold-plated copper and tinned copper to the surface of a semiconductive member of a material selected from the group which consists of silicon and germanium, which method comprises surrounding the members to be bonded with a non-oxidizing atmosphere, cleaning the surfaces to be bonded, heating the surfaces to a temperature approaching but less than the eutectic temperature of the materials being bonded and the dislocation forming temperature of the semiconductive member, pressing the surfaces together with a pressure which produces at least 10 percent but less than a thirty percent deformation of the lead, and maintaining the temperature and pressure for a time interval such that the surfaces become strongly bonded to each other.

6. The process of making a low resistance mechanically strong electrical connection to a body of semiconductive material taken from the group consisting of germanium and silicon comprising the steps of bonding to the surface of said body a thin strip of the order of a mil wide of a metal taken from the group consisting of gold and aluminum, and pressing a wire lead of the order of a mil diameter of a metal selected from the group consisting of gold, silver, aluminum, copper, gold plated copper and tinned copper to said thin strip with a pressure sufficient to cause perceptible deformation of the wire, while maintaining the body and the wire lead at temperatures less than both the eutectic temperature of the combination of materials and the dislocation formation temperature of the semiconductor, for a time to form a strong bond.

References Cited in the file of this patent

UNITED STATES PATENTS

| | | |
|---|---|---|
| 2,564,738 | Tank | Aug. 21, 1951 |
| 2,671,746 | Brew | Mar. 9, 1954 |
| 2,698,548 | Sowter | Jan. 4, 1955 |
| 2,739,369 | Cooney | Mar. 27, 1956 |
| 2,751,808 | MacDonald et al. | June 26, 1956 |
| 2,757,324 | Pearson | July 31, 1956 |
| 2,805,370 | Wilson | Sept. 3, 1957 |
| 2,817,607 | Jenny | Dec. 24, 1957 |
| 2,879,587 | Mushovic et al. | Mar. 31, 1959 |

OTHER REFERENCES

The Welding Journal, August 1951, pp. 728–730.